(12) United States Patent
Han

(10) Patent No.: US 9,348,681 B2
(45) Date of Patent: May 24, 2016

(54) APPARATUS AND METHOD FOR DETECTING FAULT OF PROCESSOR

(71) Applicant: ELECTRONICS AND TELECOMMUNICATIONS RESEARCH INSTITUTE, Daejeon (KR)

(72) Inventor: Jin-Ho Han, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 155 days.

(21) Appl. No.: 14/255,481

(22) Filed: Apr. 17, 2014

(65) Prior Publication Data

US 2014/0344623 A1    Nov. 20, 2014

(30) Foreign Application Priority Data

May 14, 2013    (KR) .................. 10-2013-0054079

(51) Int. Cl.
*G06F 11/00*        (2006.01)
*G06F 11/07*        (2006.01)

(52) U.S. Cl.
CPC ........ *G06F 11/0724* (2013.01); *G06F 11/0721* (2013.01); *G06F 11/0751* (2013.01)

(58) Field of Classification Search
CPC .................. G06F 11/0721; G06F 11/0724
See application file for complete search history.

(56) References Cited

U.S. PATENT DOCUMENTS

| 4,985,825 | A | * | 1/1991 | Webb, Jr. | .............. G06F 9/3865 711/169 |
| 5,923,830 | A | * | 7/1999 | Fuchs | ................. G06F 11/1641 714/11 |
| 6,732,300 | B1 | * | 5/2004 | Freydel | ................. G06F 11/184 714/10 |
| 7,366,948 | B2 | * | 4/2008 | Michaelis | ........... G06F 11/2051 714/12 |
| 7,370,243 | B1 | * | 5/2008 | Grohoski | .............. G06F 9/3851 714/25 |
| 8,051,247 | B1 | | 11/2011 | Favor et al. | |
| 8,095,821 | B2 | * | 1/2012 | Mayer | ................. G06F 11/0772 714/10 |
| 2006/0168485 | A1 | * | 7/2006 | Jusufovic | .............. G06F 9/3865 714/49 |
| 2007/0067663 | A1 | | 3/2007 | Surasinghe | |
| 2008/0177990 | A1 | * | 7/2008 | Banerjee | ............. G06F 9/30156 712/227 |

(Continued)

FOREIGN PATENT DOCUMENTS

JP      2009-015590 A    1/2009

OTHER PUBLICATIONS

G. Giles, J. Wang, A. Sehgal, K. J. Balakrishnan, and J. Wingfield; "Test Access Mechanism for Multiple Identical Cores;" in ITC, 2009, pp. 1-10.*

*Primary Examiner* — Joseph Kudirka
(74) *Attorney, Agent, or Firm* — Rabin & Berdo, P.C.

(57) ABSTRACT

An apparatus and method for detecting the fault of a processor are disclosed. The apparatus includes a fetch fault control unit, a decoding fault control unit, and an execution fault control unit. The fetch fault control unit detects the fault of each of fetch units of a plurality of processor cores connected to memory. The decoding fault control unit detects the fault of each of decoding units of the plurality of processor cores connected to the memory. The execution fault control unit detects the fault of each of execution units of the plurality of processor cores connected to the memory, executes the same instruction in the plurality of processor cores, determines a processor core where a fault has occurred, and provides notification of the determined processor to the fetch fault control unit and the decoding fault control unit.

9 Claims, 2 Drawing Sheets

(56) References Cited

U.S. PATENT DOCUMENTS

| | | |
|---|---|---|
| 2009/0013217 A1 | 1/2009 | Shibata et al. |
| 2011/0161630 A1* | 6/2011 | Raasch .............. G06F 9/30196 712/205 |
| 2011/0179308 A1 | 7/2011 | Pathirane et al. |
| 2013/0332774 A1* | 12/2013 | Sinanoglu ............. G06F 11/263 714/32 |
| 2015/0149836 A1* | 5/2015 | Kwon ................. G06F 11/0721 714/49 |

\* cited by examiner

APPARATUS AND METHOD FOR DETECTING FAULT OF PROCESSOR

CROSS REFERENCE TO RELATED APPLICATION

This application claims the benefit of Korean Patent Application No. 10-2013-0054079, filed on May 14, 2013, which is hereby incorporated by reference in its entirety into this application.

BACKGROUND OF THE INVENTION

1. Technical Field

The present invention relates generally to an apparatus and method for detecting the fault of a processor and, more particularly, to an apparatus and method that detect and correct the fault of a processor when the fault has occurred.

2. Description of the Related Art

Processors read and analyze instructions stored in external storage devices, and perform specific operations using operands designated by the instructions. Furthermore, the processors store the execution results of the specific operations in the external storage devices, and perform specific functions using stored programs.

A processor includes a fetch unit, a decoding unit, an execution unit, and a register file.

The fetch unit functions to read an instruction to be executed from memory (an external storage device) and transfer the instruction to the decoding unit.

The decoding unit analyzes the received instruction, operates a required arithmetic and logic unit (ALU) of the execution unit, and makes the input of the ALU be read from the register file.

The execution unit transfers an operand read from the register file to the corresponding ALU, and makes the operation result of the ALU be stored in the memory or register file.

The register file reads data from or writes data into memory, reads an operand stored as information received from the decoding unit, and transfers the operand to the execution unit.

A fault may occur in the fetch unit, the decoding unit, the execution unit and the register file, and may influence the processing results of the processor.

As related technology, Japanese Patent Application Publication No. 2009-015590A discloses an apparatus for detecting the fault of multiple cores that is capable of determining the operating status of each processor core.

While Japanese Patent Application Publication No. 2009-015590A discloses the configuration of a device in which multiple processor cores have been employed, it does not disclose technology for the detection of a fault in each unit of the processor cores.

SUMMARY OF THE INVENTION

Accordingly, the present invention has been made keeping in mind the above problems occurring in the conventional art, and an object of the present invention is to provide an apparatus and method for detecting the fault of a processor that are capable of detecting and correcting the fault of each internal unit of a processor.

In accordance with an aspect of the present invention, there is provided an apparatus for detecting the fault of a processor, including a fetch fault control unit configured to detect the fault of each of fetch units of a plurality of processor cores connected to memory; a decoding fault control unit configured to detect the fault of each of decoding units of the plurality of processor cores connected to the memory; and an execution fault control unit configured to detect the fault of each of execution units of the plurality of processor cores connected to the memory, and to execute the same instruction in the plurality of processor cores, determine a processor core where a fault has occurred, and provide notification of the determined processor to the fetch fault control unit and the decoding fault control unit.

The plurality of processor cores may be three in number; and the execution fault control unit, if execution results of two of the three processor cores are the same and the execution result of a remaining processor core is different from the execution results of the two processors, may determine the remaining processor core to be a processor core in which the fault has occurred.

The execution fault control unit may transfer a command to cancel all instructions derived from the instruction executed in the remaining processor core having the different execution result and a normal instruction to the fetch fault control unit and the decoding fault control unit.

The fetch fault control unit may cancel the corresponding instruction in the remaining processor core and correct the instruction to the normal instruction, based on the command and the normal instruction from the execution fault control unit.

The decoding fault control unit may cancel the corresponding instruction in the remaining processor core and correct the instruction to the normal instruction, based on the command and the normal instruction from the execution fault control unit.

The plurality of processor core may be at least four in number.

In accordance with an aspect of the present invention, there is provided a method of detecting the fault of a processor in a multi-processor in which first to third processor cores in which fetch units are connected to a fetch fault control unit, decoding units are connected to a decoding fault control unit, and execution units are connected to an execution fault control unit is connected to memory, the method including executing, by the execution fault control unit, a same instruction in the first and second processor cores; comparing, by the execution fault control unit, execution results of the first and second processor cores; executing, by the execution fault control unit, the instruction in the third processor core if the execution results of the first and second processor cores are different from each other; and, if execution results of two of the three processor cores are the same and an execution result of a remaining processor core is different from the execution results of the two processors, determining, by the execution fault control unit, the remaining processor core to be a processor core in which the fault has occurred.

The method may further include transferring, by the execution fault control unit, a command to cancel all instructions derived from the instruction executed in the remaining processor core having the different execution result and a normal instruction to the fetch fault control unit and the decoding fault control unit.

The method may further include cancelling, by the fetch fault control unit, the corresponding instruction in the remaining processor core, and correcting, by the fetch fault control unit, the instruction to the normal instruction, based on the command and the normal instruction from the execution fault control unit.

The method may further include cancelling, by the decoding fault control unit, the corresponding instruction in the remaining processor core and correcting the instruction to the normal instruction, based on the command and the normal instruction from the execution fault control unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
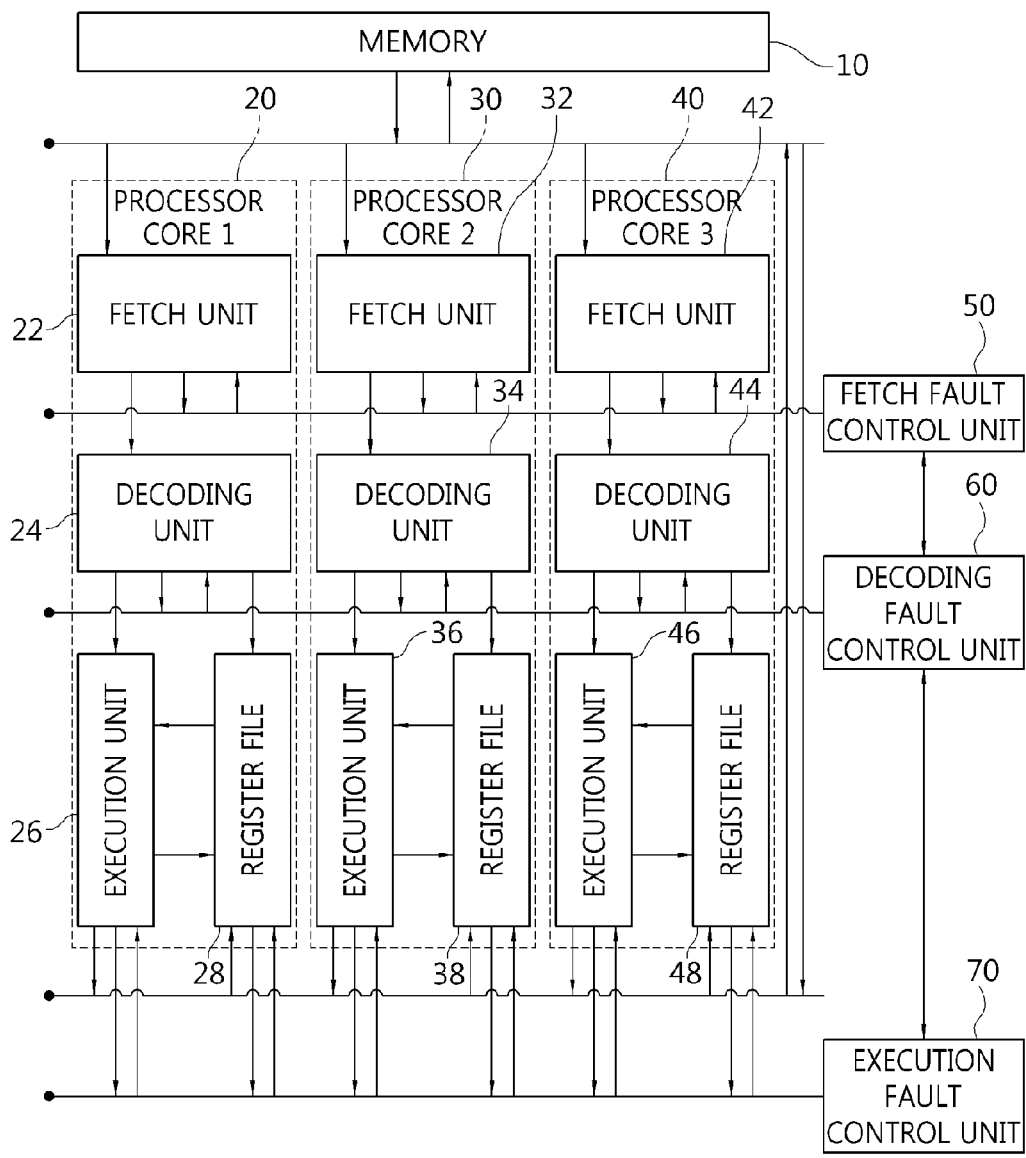
FIG. 1 is a diagram illustrating the configuration of an apparatus for detecting the fault of a processor according to an embodiment of the present invention.

An apparatus and method for detecting the fault of a processor according to embodiments of the present invention will be described below with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present invention. Accordingly, it should be appreciated that there may be various equivalents and modifications that can replace the embodiments and the configurations at the time at which the present application is filed.

FIG. 1 is a diagram illustrating the configuration of an apparatus for detecting the fault of a processor according to an embodiment of the present invention.

The apparatus for detecting the fault of a processor according to this embodiment of the present invention may be applied to a multi-processor structure in which a plurality of processor cores 20, 30 and 40 having the same structure is connected to memory 10. In this case, each of the processor cores 20, 30 and 40 includes a fetch unit, a decoding unit, an execution unit, and a register file.

Basically, when the processor cores 20, 30 and 40 executes a specific instruction, they should output the same result. Nevertheless, at least one of the processor cores 20, 30 and 40 may output a result different from that of the other processor cores. Accordingly, the apparatus for detecting the fault of a processor according to this embodiment of the present invention is required.

The fetch units 22, 32 and 42 provided in the respective processor cores 20, 30 and 40 perform communication for the correction of a fault with a fetch fault control unit 50.

In this case, the fetch units 22, 32 and 42 read instructions to be executed from the memory 10, and transfer the instructions to the corresponding decoding units 24, 34 and 44. In this case, the fetch fault control unit 50 distributes the simultaneously read instructions among the three processor cores 20, 30 and 40. The fetch fault control unit 50 assigns instructions including the same register operation to the same processor core by examining register dependency during the distribution. Otherwise the fetch fault control unit 50 provides notification of related information to the decoding fault control unit 60 and the execution fault control unit 70.

Meanwhile, the decoding units 24, 34 and 44 provided in the respective processor cores 20, 30 and 40 perform communication for the correction of a fault with the decoding fault control unit 60.

In this case, the decoding units 24, 34 and 44 analyze the instructions received from the corresponding fetch units 22, 32 and 42, operate required arithmetic and logic units (ALUs) in the execution units 26, 36 and 46, and make the input of the ALUs be read from corresponding register files 28, 38 and 48. In this case, the decoding fault control unit 60 performs register renaming based on information received from the fetch fault control unit 50. The reason why register renaming is performed is to, when the same instruction is executed in the same processor core and when an instruction performing an operation on a register value having dependency on an instruction that is executed in another processor core is executed, prevent an existing register value from being influenced.

Meanwhile, the execution units 26, 36 and 46 and register units 28, 38 and 48 provided in the respective processor cores 20, 30 and 40 perform communication for the correction of a fault with the execution fault control unit 70.

In this case, the execution units 26, 36 and 46 transfer the operands read from the register files 28, 38 and 48 to the ALUs of the corresponding execution units, and store the operation results of the ALUs in the memory 10 or the register files 28, 38 and 48. The register files 28, 38 and 48 read data from or write data into the memory 10, read operands stored as information received from the corresponding decoding units 24, 34 and 44, and transfer the read operands to the execution units 26, 36 and 46 of the corresponding processor cores. In this case, the execution fault control unit 70 functions to move operation results to the register files 28, 38 and 48 of the different processor cores when instructions having dependency are executed in the different processor core. Furthermore, the execution fault control unit 70 compares the execution results of instructions A1, A2 and A3 with one another, thereby determining whether a fault has occurred, identifying an instruction having no fault when a fault has occurred, and determining whether a fault can be corrected when the fault has occurred. For example, if one of the three instructions A1, A2 and A3 is faulty, the remaining two instructions are normal, so that all instructions derived from the fault instruction may be cancelled and the faulty instruction may be corrected based on the two normal instructions.

The same fetch fault control unit 50, the decoding fault control unit 60, and the execution fault control unit 70 perform the following fault detection algorithm.

A single instruction A stored in the memory 10 is performed in the processor cores 20 and 30. In this case, the instruction A that is executed in the processor core 20 is set to an instruction A1, and the instruction A that is executed in the processor core 30 is set to an instruction A2.

In a first clock cycle, the fetch fault control unit 50 activates the fetch unit 22 of the processor core 20 and the fetch unit 32 of the processor core 30. Accordingly, the fetch unit 22 reads the instruction A1 from the memory 10, and the fetch unit 32 reads the instruction A2 from the memory 10. In this case, the instructions A1 and A2 are the same instruction. In this case, the fetch fault control unit 50 provides notification that the fetch unit 22 is reading the instruction A1 and the fetch unit 32 is reading the instruction A2 to the decoding fault control unit 60. Meanwhile, the fetch fault control unit 50 stores the fact that the fetch unit 22 is currently reading the instruction A1 and the fetch unit 32 is currently reading the instruction A2.

In a second clock cycle, the instructions A1 and A2 read by the fetch units 22 and 32 are input to the decoding units 24 and 34. That is, the instruction A1 is input to the decoding unit 24, and the instruction A2 is input to the decoding unit 34. Accordingly, the decoding unit 24 analyzes the instruction A1, operates the required ALU of the execution unit 26, and then reads the input of the ALU from the register file 28. The decoding unit 34 analyzes the instruction A2, operates the required ALU of the execution unit 36, and reads the input of the ALU from the register file 38. In this case, the decoding fault control unit 60 may internally store register values read by the decoding units 24 and 34.

In addition, in the second clock cycle, the fetch unit 22 of the processor core 20 reads an instruction B1-1, and the fetch unit 32 of the processor core 30 reads an instruction B2-1. In this case, the fetch fault control unit 50 stores the fact that the fetch unit 22 is currently reading the instruction B1-1, and the fetch unit 32 is currently reading the instruction B2-1.

In a third clock cycle, the instructions A1 and A2 are executed in the execution units 26 and 36. That is, the execution unit 26 executes an operand read from the register file 28 based on the instruction A1. The execution unit 36 executes an operand read from the register file 38 based on the instruction A2. The execution results of the execution units 26 and 36, that is, the results of the instructions A1 and A2 are stored in the respective register files 28 and 38, and the execution results may be transferred to the execution fault control unit 70. In this case, if the execution results of the instruction A1 and A2 are not the same, the execution fault control unit 70 may determine that a fault has occurred in any one of the processor cores 20 and 30. If it is determined that a fault has occurred as described above, the instructions A needs to be executed again and it needs to be determined that the execution results of two instructions A having produced the same result are execution results having no fault. Accordingly, the instruction A3 (that is, an instruction that is the same as the instructions A1 and A2) is executed in the processor core 40 again. Furthermore, instructions B compliant with the results of the instructions A1 and A2 are additionally executed because the results of the instructions A1 and A2 are different. In this case, an instruction compliant with the result of the instruction A1 is set to an instruction B1-2, and an instruction compliant with the result of the instruction A2 is set to an instruction B2-2. Furthermore, instructions C1-1, C1-2, C2-1 and C2-2, which are instructions C compliant with the results of the instructions B1-1, B1-2, B2-1 and B2-2, are executed. Accordingly, in the third clock cycle, the fetch units 22, 32 and 42 may read a total of seven instructions, that is, the instructions A3, B1-2, B2-2, C1-1, C1-2, C2-1, and C2-2, and a limited number of processor cores 20, 30 and 40 sequentially execute the instructions.

In a fourth clock cycle, the instruction B1-1 and B2-1 are executed in the execution units. That is, the execution unit 26 executes an operand read from the register file 28 based on the instruction B1-1. The execution unit 36 executes an operand read from the register file 38 based on the instruction B2-1. The execution results of the execution units 26 and 36, that is, the results of the instructions B1-1 and B2-1, are stored in the respective register files 28 and 38, and the execution results may be transferred to the execution fault control unit 70. The instructions A3, B1-2, B2-2, C1-1, C1-2, C2-1 and C2-2 are executed in the decoding units. That is, the instruction A3 is input to and executed in the decoding unit 44 of the processor core 40, the instructions B1-2, C1-1, and C1-2 are sequentially input to and executed in the decoding unit 24 of the processor core 20, and the instructions B2-2, C2-1 and C2-2 are sequentially input and executed in the decoding unit 34 of the processor core 30. Furthermore, the fetch units 22 and 32 read instructions D, that is, instructions D1-1, D1-2, D2-1 and D2-2, based on the execution results of the instructions B1-1 and B2-1 in the execution units 26 and 36.

In a fifth clock cycle, the instruction A3 is executed by the execution unit 46 of the processor core 40, and the result of the execution is obtained. In this case, the execution result of the instruction A3 is stored in the register file 48, and the execution result may be transferred to the execution fault control unit 70. In this case, for example, if the result of the instruction A3 is the same as the result of the instruction A1, the execution fault control unit 70 cancels all instructions derived from the instruction A2 being executed already. The results of the instructions B1-1 and B1-2 derived from the instruction A1 executed in the execution unit 26 are also obtained. If the results of the instructions B1-1 and B1-2 are the same and the results of the instructions C1-1 and C1-2 are the same, subsequent instructions E, that is, instructions E1-1 and E1-2, are read from the fetch units. In this case, if instructions are cancelled, the execution fault control unit 70 provides notification of the cancellation and a normal instruction to the fetch fault control unit 50 and the decoding fault control unit 60. As a result, the fetch fault control unit 50 and the decoding fault control unit 60 become aware of the cancelled instructions and a processor core in which the cancelled instructions have been executed. In this case, the cancellation includes the cancellation of corresponding register values based on execution results and correction to a normal instruction. That is, the fetch fault control unit 50 and the decoding fault control unit 60 may cancel corresponding instructions and perform correction to a normal instruction based on a command to cancel all instructions derived from the instruction A2 and a message indicative of a normal instruction.

As described above, the above-described embodiment of the present invention is performed in such a way as to, if the execution results of the instructions N1 and N2 are different from each other, additionally execute an instruction N3, select, from the results of the instructions N1 and N2, an instruction Nx having a result that is the same as the result of the instruction N3, and cancel instructions derived from a not selected instruction Nx. This enables the distribution of a fault detection apparatus and fault detection and correction for each internal unit of a processor, thereby increasing the rates of fault detection and correction.

Figure 2:
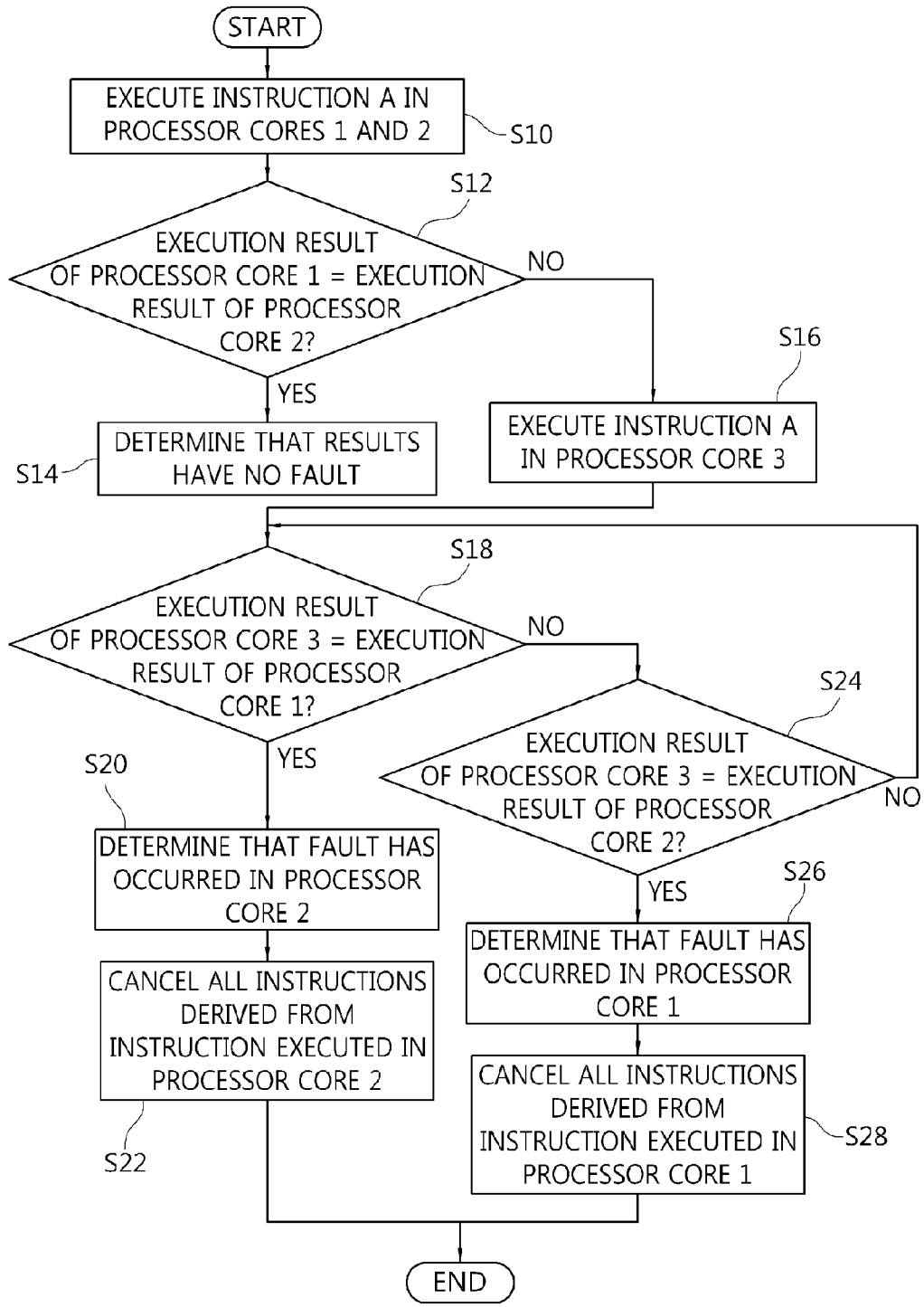
FIG. 2 is a flowchart illustrating the operation of an apparatus for detecting the fault of a processor according to an embodiment of the present invention.

The operation of the apparatus for detecting the fault of a processor according to an embodiment of the present invention will now be described with reference to the flowchart of FIG. 2.

At step S10, a single instruction A stored in the memory 10 is performed in the processor cores 20 and 30. In this case, the fetch units 22 and 32, decoding units 24 and 34 and the execution unit 26 and 36 of the processor cores 20 and 30 operate in conjunction with the fetch fault control unit 50, the decoding fault control unit 60, and the execution fault control unit 70.

At step S12, the execution fault control unit 70 compares the execution results of the processor core 20 with the execution results of the processor core 30.

At step S14, if, as a result of the comparison at step S12, it is determined that the execution results are the same, the execution fault control unit 70 determines that the execution results of the instructions A have no fault. In this case, the execution fault control unit 70 may provide notification of this to the fetch fault control unit 50 and the decoding fault control unit 60.

At step S16, if, as a result of the comparison at step S12, it is determined that the execution results are different from each other, the execution fault control unit 70 cannot accurately determine one of the processor core 20 and 30 in which a fault has occurred and thus issues a command to execute an instruction A in the processor core 40.

At step S18, the execution fault control unit 70 compares the execution results of the processor core 40 with the execution results of the processor core 20.

At step S20, if, as a result of the comparison at step S18, the results are the same, the execution fault control unit 70 determines that a fault has occurred in the processor core 30.

Accordingly, at step S22, the execution fault control unit 70 cancels all instructions derived from the instruction A executed in the processor core 30. In this case, the execution fault control unit 70 provides notification of information indicative that a fault has occurred in the processor core 30 and a normal instruction to the fetch fault control unit 50 and the decoding fault control unit 60. As a result, the fetch fault control unit 50 and the decoding fault control unit 60 become aware of the occurrence of a fault in the processor core 30 and the cancelled instruction. In this case, the cancellation includes the cancellation of corresponding register values based on the execution results of the processor core 30 and correction of the instructions to a normal instruction. That is, the fetch fault control unit 50 and the decoding fault control unit 60 may cancel corresponding instructions derived from the instruction A and correct them to a normal instruction.

Meanwhile, at step S18, if the execution result of the processor core 40 is different from the execution result of the processor core 20, the process moves to step S24, at which the execution fault control unit 70 compares the execution result of the processor core 40 with the execution result of the processor core 30.

At step S24, if the execution result of the processor core 40 is the same as the execution result of the processor core 30, the execution fault control unit 70 determines that a fault has occurred in the processor core 20 at step S26.

Accordingly, at step S28, the execution fault control unit 70 cancels all instructions derived from the instruction A executed in the processor core 20. In this case, the execution fault control unit 70 transfers information indicative that a fault has occurred in the processor core 20 and a normal instruction to the fetch fault control unit 50 and the decoding fault control unit 60. As a result, the fetch fault control unit 50 and the decoding fault control unit 60 become aware of the occurrence of the fault in the processor core 20 and the cancelled instructions. In this case, the cancellation includes the cancellation of corresponding register values based on execution results and correction to a normal instruction. That is, the fetch fault control unit 50 and the decoding fault control unit 60 may cancel instructions derived from the instruction A and correct them to a normal instruction.

Meanwhile, while the above-described embodiment of the present invention proposes a multi-processor structure in which the three processor cores 20, 30 and 40 have been connected, the number of processor cores may be at least four.

It will be apparent that the number of processor cores may be one. If the present invention is applied to a single processor core, a single instruction may be executed in each unit at least three times in order to determine a unit where a fault has occurred. If the present invention is applied to a single processor core, this case is lower in processing speed than the above-described case where the present invention is applied to a multi-processor structure, but is simpler in configuration than the above-described case.

In accordance with the present invention, the apparatus for detecting a fault is provided for each internal block of a processor, so that the processor becomes more robust to a fault and also an internal fault of the processor can be detected.

Furthermore, the erroneous results of a processor attributable to a fault can be prevented from being obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting a fault of a processor that includes a plurality of processor cores connected to a memory, each processor core having a fetch unit, a decoding unit, and an execution unit, the apparatus comprising:
   a fetch fault control unit configured to detect a fault occurring in any of the fetch units of the plurality of processor cores;
   a decoding fault control unit configured to detect a fault occurring in any of the decoding units of the plurality of processor cores; and
   an execution fault control unit configured to detect a fault occurring in any of the execution units of the plurality of processor cores, the execution fault control unit being configured to execute a same instruction in the plurality of processor cores, to determine a processor core in which a fault has occurred to be a faulty processor core, and to provide a notification of the faulty processor core to the fetch fault control unit and the decoding fault control unit.

2. The apparatus of claim 1, wherein:
   the plurality of processor cores include three processor cores; and
   the execution fault control unit, when execution results of two of the three processor cores are the same and an execution result of the remaining processor core is different from the execution results of the two processor cores, determines the remaining processor core to be the faulty processor core.

3. The apparatus of claim 2, wherein the execution fault control unit transfers a first command, as the notification, to cancel a corresponding instruction derived from a faulty instruction that has been executed in the faulty processor core and that has the different execution result from the execution results of the two processor cores, and further transfers a second command to the fetch fault control unit and the decoding fault control unit to correct the faulty instruction.

4. The apparatus of claim 3, wherein the fetch fault control unit cancels the corresponding instruction in the faulty processor core and corrects the faulty instruction to a correct instruction according to an instruction that has been executed by a processor core other than the faulty processor core, based on the first command and the second command from the execution fault control unit.

5. The apparatus of claim 3, wherein the decoding fault control unit cancels the corresponding instruction in the faulty processor core and corrects the faulty instruction to a correct instruction according to an instruction that has been executed by a processor core other than the faulty processor core, based on the first command and the second command from the execution fault control unit.

6. The apparatus of claim 1, wherein the plurality of processor cores include at least four processor cores.

7. A method of detecting a fault of a processor in a multi-processor in which first to third processor cores include corresponding fetch units that are connected to a fetch fault control unit, corresponding decoding units are that connected to a decoding fault control unit, and corresponding execution units that are connected to an execution fault control unit, wherein the execution fault control unit is connected to memory, the method comprising:
- executing, by the execution fault control unit, a same instruction in the first and second processor cores;
- comparing, by the execution fault control unit, execution results of the first and second processor cores;
- executing, by the execution fault control unit, the instruction in the third processor core if the execution results of the first and second processor cores are different from each other;
- if execution results of two of the three processor cores are the same and an execution result of a remaining processor core is different from the execution results of the two processors, determining, by the execution fault control unit, the remaining processor core to be a processor core in which the fault has occurred; and
- transferring, by the execution fault control unit, a command to cancel all instructions derived from the instruction executed in the remaining processor core having the different execution result and a normal instruction to the fetch fault control unit and the decoding fault control unit.

8. The method of claim 7, further comprising cancelling, by the fetch fault control unit, the corresponding instruction in the remaining processor core, and correcting, by the fetch fault control unit, the instruction to the normal instruction, based on the command and the normal instruction from the execution fault control unit.

9. The method of claim 7, further comprising cancelling, by the decoding fault control unit, the corresponding instruction in the remaining processor core and correcting the instruction to the normal instruction, based on the command and the normal instruction from the execution fault control unit.

* * * * *